(12) United States Patent
Wang et al.

(10) Patent No.: US 10,880,598 B2
(45) Date of Patent: Dec. 29, 2020

(54) VIDEO DATA GENERATION METHOD, COMPUTER DEVICE, AND STORAGE MEDIUM

(71) Applicant: TENCENT TECHNOLOGY (SHENZHEN) COMPANY LIMITED, Shenzhen (CN)

(72) Inventors: Qianyi Wang, Shenzhen (CN); Yanggang Dai, Shenzhen (CN); Yu Gao, Shenzhen (CN); Bin Fu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/506,422

(22) Filed: Jul. 9, 2019

(65) Prior Publication Data

US 2019/0335229 A1    Oct. 31, 2019

Related U.S. Application Data

(63) Continuation of application No. PCT/CN2018/080520, filed on Mar. 26, 2018.

(30) Foreign Application Priority Data

Apr. 21, 2017   (CN) .......................... 2017 1 0266687

(51) Int. Cl.
*H04N 21/439*   (2011.01)
*H04N 21/431*   (2011.01)
(Continued)

(52) U.S. Cl.
CPC ....... *H04N 21/4394* (2013.01); *G06F 16/685* (2019.01); *H04N 21/4312* (2013.01); *H04N 21/8106* (2013.01); *H04N 21/8456* (2013.01)

(58) Field of Classification Search
CPC .......... H04N 21/4394; H04N 21/4312; H04N 21/8106; H04N 21/8456; H04N 21/8113;
(Continued)

(56) References Cited

U.S. PATENT DOCUMENTS

| 7,446,252 | B2 | 11/2008 | Tagawa et al. |
| 2007/0256548 | A1* | 11/2007 | Tagawa ................ G10H 1/0008 84/634 |

(Continued)

FOREIGN PATENT DOCUMENTS

| CN | 1950879 A | 4/2007 |
| CN | 105142017 A | 9/2015 |

(Continued)

OTHER PUBLICATIONS

International Search Report dated Jun. 21, 2018 in Application No. PCT/CN2018/080520 with English Translation.

(Continued)

*Primary Examiner* — Cynthia M Fogg
(74) *Attorney, Agent, or Firm* — Oblon, McClelland, Maier & Neustadt, L.L.P.

(57) ABSTRACT

Aspects of the disclosure provide methods and apparatuses for generating video data. In some examples, an apparatus for generating the video data includes processing circuitry. The processing circuitry obtains tempo information from audio data that is inserted in a target video. The processing circuitry determines a plurality of target tempo points in the tempo information according to video effect time description information included in a video effect description file. The video effect description file includes video effect data that is used to adjust one or more video frames of an original video. The processing circuitry obtains the one or more video frames from the original video according to the plurality of target tempo points. The processing circuitry adjusts the one (Continued)

or more video frames with the video effect data. The processing circuitry generates the target video including the adjusted one or more video frames and the audio data.

18 Claims, 13 Drawing Sheets

(51) Int. Cl.
*H04N 21/81* (2011.01)
*H04N 21/845* (2011.01)
*G06F 16/683* (2019.01)

(58) Field of Classification Search
CPC ........... H04N 21/4402; H04N 21/2343; H04N 21/8547; H04N 21/233; H04N 21/234; H04N 21/439; H04N 21/44; H04N 21/4307; H04N 21/2368; H04N 9/806; H04N 9/8211; H04N 21/4398; H04N 5/04; H04N 5/60; H04N 5/602; G06F 16/685; G11B 27/031; G11B 27/28
USPC .......................................................... 725/32
See application file for complete search history.

(56) References Cited

U.S. PATENT DOCUMENTS

| | | | | |
|---|---|---|---|---|
| 2008/0115656 | A1* | 5/2008 | Sumita | G10G 3/04 84/612 |
| 2009/0273712 | A1* | 11/2009 | Landy | G11B 27/034 348/515 |
| 2009/0307207 | A1* | 12/2009 | Murray | G06F 16/433 |
| 2010/0118033 | A1* | 5/2010 | Faria | G10H 1/368 345/473 |
| 2010/0257994 | A1* | 10/2010 | Hufford | G10H 1/0025 84/609 |
| 2011/0144780 | A1* | 6/2011 | Ueshima | G06T 13/205 700/94 |
| 2012/0017150 | A1* | 1/2012 | Pollack | H04N 5/76 715/716 |
| 2015/0154452 | A1* | 6/2015 | Bentley | G11B 27/031 386/201 |
| 2017/0062009 | A1* | 3/2017 | Clifton | G06F 40/14 |

FOREIGN PATENT DOCUMENTS

| | | |
|---|---|---|
| CN | 105704542 A | 6/2016 |
| CN | 107124624 A | 9/2017 |
| JP | 2002023716 A | 1/2002 |

OTHER PUBLICATIONS

Written Opinion dated Jun. 21, 2018 in Application No. PCT/CN2018/080520 (w/English translation).

* cited by examiner

VIDEO DATA GENERATION METHOD, COMPUTER DEVICE, AND STORAGE MEDIUM

RELATED APPLICATION

This application is a continuation of International Application No. PCT/CN2018/080520, filed on Mar. 26, 2018, which claims priority to Chinese Patent Application No. 201710266687.7, entitled "VIDEO DATA GENERATION METHOD AND APPARATUS" and filed on Apr. 21, 2017. The entire disclosures of the prior applications are hereby incorporated by reference in their entirety.

FIELD OF THE TECHNOLOGY

This application relates to the field of computer technologies, and in particular, to a video data generation method, a computer device, and a storage medium.

BACKGROUND OF THE DISCLOSURE

With development of computer technologies, application of mutual combination of a network and a multimedia technology becomes increasingly popular in people's daily life. Background music may be inserted into a recorded video, and various effects may be added to the video, such as video clipping, video playback speed adjustment, adding a watermark to the video, superimposing animation onto the video, and subtitles.

In a related method, a video and music are independent from each other. In this case, the video has a low correlation with the music, and the video and the music cannot cooperate with each other during playback.

SUMMARY

Aspects of the disclosure provide methods and apparatuses for generating video data. In some examples, an apparatus for generating the video data includes processing circuitry.

The processing circuitry obtains tempo information from audio data that is inserted in a target video. The processing circuitry determines a plurality of target tempo points in the tempo information according to video effect time description information included in a video effect description file. The video effect description file includes video effect data that is used to adjust one or more video frames of an original video. The processing circuitry obtains the one or more video frames from the original video according to the plurality of target tempo points. The processing circuitry adjusts the one or more video frames with the video effect data included in the video effect description file. The processing circuitry generates the target video including the adjusted one or more video frames and the audio data.

In an embodiment, the processing circuitry determines a first array from waveform data that is converted from the audio data. Each element in the first array is a time point corresponding to a maximum amplitude of the waveform data within a preset duration window. The processing circuitry determines a second array based on the first array. Each element in the second array is a time interval corresponding to two adjacent time points in the first array. The processing circuitry determines, based on the first array and the second array, a plurality of tempo points from the audio data as the tempo information of the audio data.

In an embodiment, the processing circuitry obtains video effect start-time description information from the video effect time description information. The processing circuitry determines a start tempo point in the tempo information according to the video effect start-time description information. The processing circuitry obtains video effect duration description information from the video effect time description information. The processing circuitry determines a termination tempo point in the tempo information according to the video effect duration description information.

In an embodiment, when the video effect data is video superimposing data, the processing circuitry determines a superimposition time of the video superimposing data as a tempo occurrence time of the plurality of target tempo points. The processing circuitry obtains one or more video frames according to the tempo occurrence time. The processing circuitry superimposes the video superimposing data onto the one or more video frames to form one or more superimposed video frames.

In an embodiment, when the video superimposing data includes start tempo point data and termination tempo point data, and the plurality of target tempo points include a start tempo point and a termination tempo point, the processing circuitry determines a superimposition time of the start tempo point data as a first tempo occurrence time corresponding to the start tempo point. The processing circuitry determines a superimposition time of the termination tempo point data as a second tempo occurrence time corresponding to the termination tempo point. The processing circuitry obtains a first video frame according to the first tempo occurrence time. The processing circuitry obtains a second video frame according to the second temp occurrence time. The processing circuitry superimposes the start tempo point data onto the first video frame. The processing circuitry superimposes the termination tempo point data onto the second video frame. The processing circuitry superimposes other superimposing data than the start tempo point data and the termination point data in the video superimposing data onto one or more video frames between the first tempo occurrence time and the second tempo occurrence time to form one or more superimposed video frames.

In an embodiment, when the video effect data is video editing data, the processing circuitry determines an editing time of the video editing data as a target occurrence time of the plurality of target tempo points. The processing circuitry obtains one or more video frames according to the target occurrence time.

In an embodiment, when the original video includes a first pause time point and an adjacent second pause time point, the processing circuitry determines, from the plurality of target tempo points, a first tempo point closest to the first pause time point as a start time of the video effect data. The processing circuitry determines, from the plurality of target tempo points, a second tempo point closest to the second pause time point as a termination time of the video effect data. The processing circuitry edits a first video frame near the first pause time point to adjust the first pause time point to the start time of the video effect data. The processing circuitry edits a second video frame near the second pause time point to adjust the second pause time point to the termination time of the video effect data.

In an embodiment, the processing circuitry obtains, from the video effect description file, a plurality of video effect data. Each of the plurality of video effect data has respective video effect time information. The processing circuitry determines, according to the respective video effect time description information, a plurality of target tempo points for each of the plurality of video effect data. The processing circuitry obtains one or more video frames for each of the plurality of video effect data according to the respective plurality of target tempo points. The processing circuitry inserts each of the plurality of video effect data to the respective one or more video frames. The processing circuitry generates the target video including the one or more video frames of each of the plurality of video effect data and the audio data.

In an embodiment, when the audio data includes lyric information, the processing circuitry obtains target lyric information from the lyric information according to the plurality of target tempo points. The processing circuitry determines one or more video frames according to a start superimposition time of the target lyric information. The processing circuitry superimposes the target lyric information to the one or more video frames to form one or more superimposed video frames.

Aspects of the disclosure also provide a non-transitory computer-readable medium storing instructions which when executed by at least one processor cause the at least one processor to perform any of the methods for generating video data.

BRIEF DESCRIPTION OF THE DRAWINGS

To describe the technical solutions in the embodiments of this application more clearly, the following briefly describes the accompanying drawings required for describing the embodiments. The accompanying drawings in the following description show merely some embodiments of this application, and a person of ordinary skill in the art may still derive other drawings from these accompanying drawings.

DESCRIPTION OF EMBODIMENTS

To make the objectives, technical solutions, and advantages of this application clearer and more comprehensible, the following further describes this application in detail with reference to the accompanying drawings and embodiments. It is understood that the specific embodiments described herein are merely used to explain this application but are not intended to limit this application.

Figure 1:
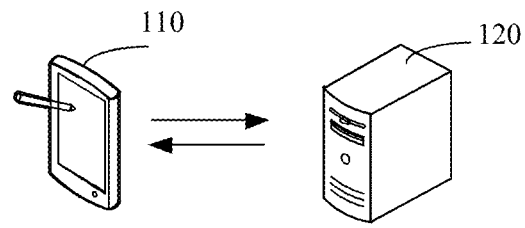
FIG. 1 is a diagram of an application environment of a video data generation method according to an embodiment.

FIG. 1 is a diagram of an application environment of running a video data generation method according to an embodiment. As shown in FIG. 1, the application environment includes a terminal 110 and a server 120, where the terminal 110 communicates with the server 120 by using a network.

The terminal 110 may be a smartphone, a tablet computer, a notebook computer, a desktop computer, or the like, but is not limited thereto. The video data generation method may be completed in the server 120 or in the terminal 110. The server 120 may obtain a to-be-processed original video from the terminal 110, generate target video data according to audio tempo information of the original video, and send the target video data to the terminal 110.

Figure 2:
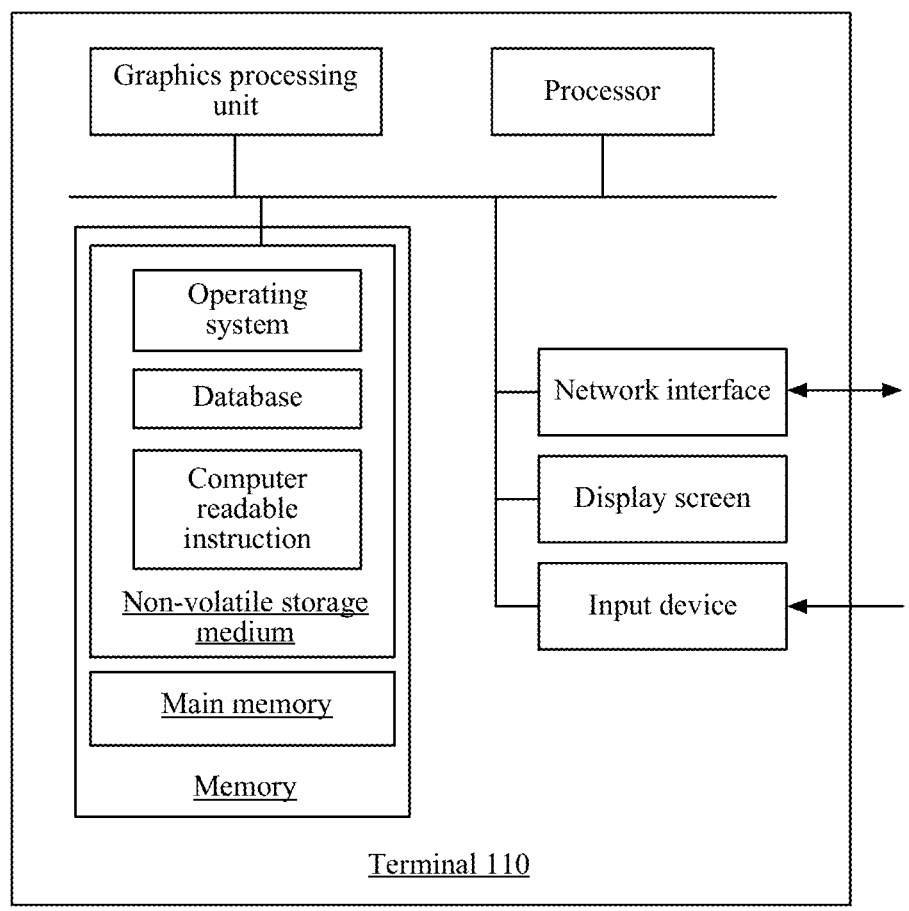
FIG. 2 is a diagram of an internal structure of a terminal in FIG. 1 according to an embodiment.

In an embodiment, an internal structure of the terminal 110 in FIG. 1 is shown in FIG. 2. The terminal 110 includes a processor (e.g., processing circuitry), a graphics processing unit, a memory, a network interface, a display screen, and an input device that are connected to each other by using a system bus. The memory of the terminal 110 includes a non-volatile storage medium and a main memory. The non-volatile storage medium of the terminal 110 may store an operating system, a database, and computer readable instructions. The computer readable instructions, when executed, cause the processor to perform a video data generation method. The processor can provide computing and control capabilities, to support running of the terminal 110. The graphics processing unit of the terminal 110 can provide at least a drawing capability of a display interface, and the network interface is configured to perform network communication with the server 120. The display screen is used to display an application interface or the like, for example, display target video data that is combined with audio data and to which a video effect is added. The input device can receive a user input command, data, or the like. The terminal 110 has a touchscreen, and the display screen and the input device may be the touchscreen.

Figure 3:
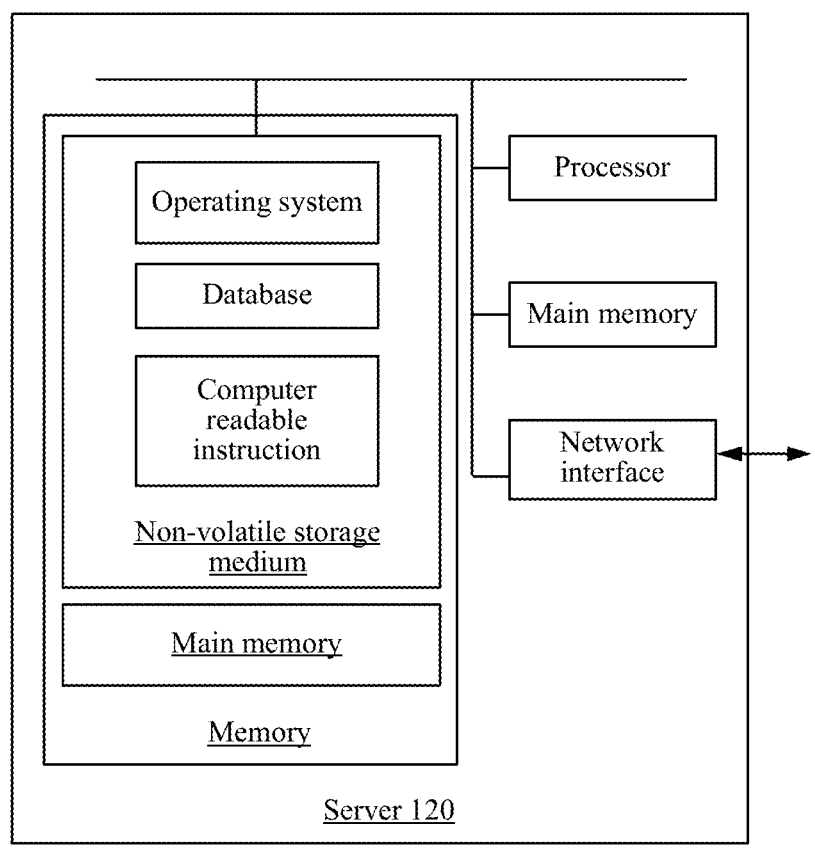
FIG. 3 is a diagram of an internal structure of a server in FIG. 1 according to an embodiment.

In an embodiment, an internal structure of the server 120 in FIG. 1 is shown in FIG. 3, and the server 120 includes a processor (e.g. processing circuitry), a memory, and a network interface that are connected by using a system bus. The memory includes a non-volatile storage medium and a main memory. The non-volatile storage medium of the server 120 may store an operating system, a database, and a computer readable instruction. The computer readable instructions, when executed, cause the processor to perform a video data generation method. The processor of the server 120 can provide computing and control capabilities, to support running of the entire server 120. The network interface of the server 120 can perform connection communication with the external terminal 110 through a network, for example, receiving an original video uploaded by the terminal 110. In the structure shown in FIG. 2 and FIG. 3, only a block diagram of a partial structure related to a solution in this application is shown, and does not constitute a limit to the terminal to which the solution in this application is applied. It is noted the terminal or the server may include more or fewer components than those shown in the figure, or some components may be combined, or a different component deployment may be used.

Figure 4:
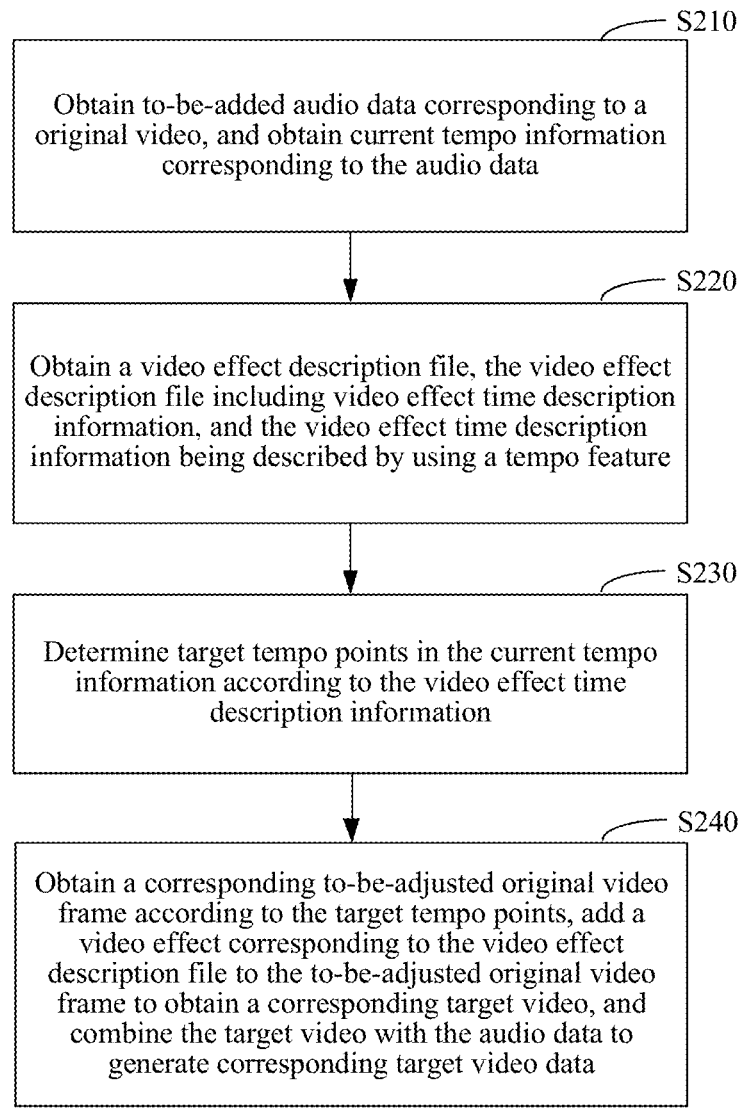
FIG. 4 is a flowchart of a video data generation method according to an embodiment.

In an embodiment, as shown in FIG. 4, a video data generation method is provided. An example in which the method is applied to a terminal or a server in the application environment is used for description, and the method includes the following steps:

Step S210. Obtain to-be-added audio data corresponding to an original video, and obtain current tempo information corresponding to the audio data. The audio data is used to be combined with a target video to generate target video data.

In an embodiment, if the video data generation method is performed on the terminal, the original video and the to-be-added (i.e., inserted) audio data may be a video and audio data that are stored in the terminal, a video and audio data that are downloaded from the server, and a video and audio data that are recorded by the terminal in real time. If the video data generation method is performed on the server, the original video and the to-be-added audio data may be a video and audio data that are uploaded by the terminal, or an original video and audio data that are stored in the server and that are determined by using a selection instruction sent by the terminal. The tempo information is information that is formed by tempo points corresponding to the audio data and that includes a tempo point identifier and a tempo point timestamp, where the tempo point includes at least one of a stress and a secondary stress. The current tempo information corresponding to the audio data may be determined by using a self-defined algorithm. The tempo information may be determined by using an electronic music (MIDI) file in the audio data, to directly use a time when the first musical note appears in each piece of the MIDI file as a tempo point time, or manually marked tempo information is obtained. Alternatively, waveform data corresponding to the audio data is scanned by using a preset duration window, to obtain a time point corresponding to a maximum amplitude corresponding to each preset duration window, thereby determining a tempo point according to a time interval of adjacent time points corresponding to the maximum amplitude. For music with 4/4 meter, the first musical note of the third beat is a secondary stress, and the secondary stress may also be used as a tempo point.

Step S220. Obtain a video effect description file. The video effect description file includes video effect time description information that is described by using a tempo feature.

In an embodiment, the video effect description file is used to describe a video effect that can be added to the original video. The video effect may include a video effect for processing a video frame, for example, video clipping and video animation, playback accelerating, playback slowing down, a video stitching motion effect, and a video separating motion effect. The video effect may further include a video effect for superimposing video and superimposing data, for example, superimposing halos, a watermark, an animation effect, or the like onto a video frame. The video effect description file may be a file compiled by using a self-defined format, for example, a file of an XML (Extensible Markup Language, extensible markup language) or json (JavaScript Object Notation, JavaScript object notation) format. The video effect time description information is used to describe a start time and a duration that correspond to a current video effect. For a video effect that periodically appears, the video effect time description information may further include information about a cycle time interval, a quantity of cycles, and the like.

The video effect time description information is described by using the tempo feature, and the tempo feature is a feature related to a tempo. For example, the start time is described by using an $N^{th}$ tempo point, the duration is described by using M tempo points, thereby ensuring that the video effect time description information is relative description information. For different audio data, because time distributions of the tempo points are different, the video effect may correspond to a different absolute time. The video effect description file may further include video effect type information, used for describing a video effect type. The video effect description file may include one or more video effect types, and each video effect type has corresponding video effect description information. The video effect description file may further include parameter information corresponding to the video effect, used for describing a presentation state of the video effect, for example, a watermark transparency parameter and a size parameter for the superimposing data, thereby improving flexibility of the video effect.

Step S230. Determine target tempo points in the current tempo information according to the video effect time description information.

In an embodiment, according to tempo feature information carried in the video effect time description information, target tempo points are selected from each tempo point corresponding to the current tempo information, where an occurrence time corresponding to the target tempo points is an actual occurrence time of the video effect. According to different video effect time description information, one or more target tempo points may be determined, where the target tempo points may be periodic tempo points, and the target tempo points may include a start tempo point and/or a termination tempo point. For example, the video effect time description information describes a flower watermark starting to be added from the first stress, until to the end of the third stress. In this case, the target tempo points include a start tempo point, that is, the first stress of the audio data, and a termination tempo point, that is, the third stress. Because the video effect time description information is described by using the tempo feature, a start time and/or a termination time of the video effect are set on tempo points, so that playback of the video effect matches a tempo of music.

Step S240. Obtain a corresponding to-be-adjusted original video frame according to the target tempo points, add a video effect corresponding to the video effect description file to the to-be-adjusted original video frame to obtain a corresponding target video, and combine the target video with the audio data to generate corresponding target video data.

In an embodiment, the target tempo points include timestamp information. A to-be-adjusted original video frame corresponding to the timestamp information is obtained, and according to different target tempo points, the to-be-adjusted original video frame is one or more original video frames. According to different video effect types, the to-be-adjusted original video frame is correspondingly processed to obtain the corresponding target video. For a video effect added for processing a video frame, the to-be-adjusted original video frame needs to be edited corresponding to the video effect, for example, extracting a frame to implement an acceleration effect, and repeating a frame to implement a repetition effect, to obtain a corresponding target video frame, and the target video frame and an original video frame that does not need to be processed from a target video. For a video effect added for superimposing a video superimposing data, the video superimposing data needs to be correspondingly superimposed onto the to-be-adjusted original video frame to obtain a target video frame. For a same to-be-adjusted original video frame, different types of video effects may be added. Because the to-be-adjusted original video frame is a video frame corresponding to the tempo point. Adjustment starts from the tempo point, and/or adjustment ended at the tempo point, so that the video effect added to the target video data generated by combining the target video with the audio data matches the tempo point, and the generated video effect is presented according to an audio tempo, thereby improving associativity of the video effect and the music tempi.

In this embodiment, the to-be-added audio data corresponding to the original video is obtained, and the current tempo information corresponding to the audio data is obtained. The video effect description file is obtained. The video effect description file includes the video effect time description information. The video effect time description information is described by using the tempo feature. The target tempo points are obtained in the current tempo information according to the video effect time description information. The corresponding to-be-adjusted original video frame is obtained according to the target tempo points, the video effect corresponding to the video effect description file is added to the to-be-adjusted original video frame to obtain the corresponding target video, and the target video is combined with the audio data to generate the corresponding target video data. The video effect time description information is described by using the tempo feature. The start time and/or the termination time of the video effect are set on the tempo points, so that the video effect added to the target video data generated by combining the target video with the audio data matches the tempo point, and the generated video effect is presented according to an audio tempo, thereby improving associativity of the video effect and the music tempi.

Figure 5:
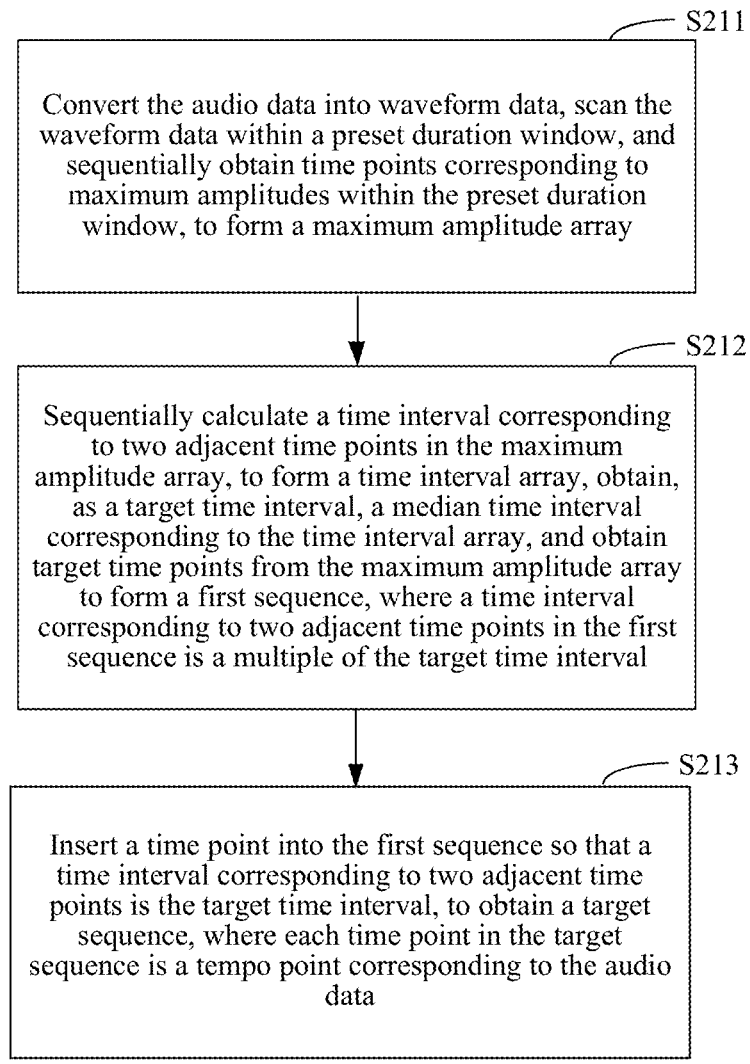
FIG. 5 is a flowchart of determining a target tempo point according to an embodiment.

In an embodiment, as shown in FIG. 5, in the step S210, the obtaining current tempo information corresponding to the audio data includes the following steps:

Step S211. Convert the audio data into waveform data, scan the waveform data within a preset duration window, and sequentially obtain time points corresponding to maximum amplitudes within the preset duration window, to form a maximum amplitude array.

In an embodiment, the waveform data reflects variation of a vibration amplitude corresponding to audio with time, a length of the preset duration window may be defined based on a requirement. In an embodiment, the preset duration window is a window of two seconds. The time points corresponding to the maximum amplitudes within the preset duration window are sequentially obtained, where the time point is an occurrence time in the entire audio. Time points corresponding to maximum amplitudes within each window are stored in a maximum amplitude array.

Step S212. Sequentially calculate a time interval corresponding to two adjacent time points in the maximum amplitude array, to form a time interval array, obtain, as a target time interval, a median time interval corresponding to the time interval array, and obtain target time points from the maximum amplitude array to form a first sequence, where a time interval corresponding to two adjacent time points in the first sequence is a multiple of the target time interval.

In an embodiment, a time interval array is re-established, a time interval corresponding to two adjacent time points in the maximum amplitude array is calculated, and each time interval is stored in the time interval array. Time interval arrays are sorted by size, and a median obtained after the sorting is taken as a median time interval, to obtain the target time interval. The target time points are selected from the maximum amplitude array to form the first sequence, so that a time interval corresponding to two adjacent time points in the first sequence is a multiple of the target time interval, where the multiple includes 1 time or more integer multiples.

Step S213. Insert a time point into the first sequence so that a time interval corresponding to two adjacent time points is the target time interval, to obtain a target sequence, where each time point in the target sequence is a tempo point corresponding to the audio data.

In an embodiment, for the first sequence, when a time interval corresponding to two adjacent time points is multiple times of the target time interval, for example, the first sequence is {2 S, 8 S, 10 S}, and the target time interval is 2 S, a time point needs to be inserted into the two adjacent time points, so that a time interval corresponding to any two adjacent time points in a target sequence obtained after the insertion is the target time interval. The target sequence obtained after the insertion is {2 S, 4 S, 6 S, 8 S, 10 S}, each time point in the target sequence is a tempo point corresponding to the audio data.

In this embodiment, according to a distribution rule of tempo points of music, usually, the tempo points are evenly distributed at a maximum amplitude, and the waveform data is scanned within the preset duration window, and are analyzed to obtain the tempo points corresponding to the audio data, which is simple and convenient.

In an embodiment, the step S230 obtains effect start-time description information from the video effect time description information, and determines a start tempo point in the current tempo information according to the effect start-time description information. The step S230 further obtains effect duration description information from the video effect time description information, and determines a termination tempo point in the current tempo information according to the effect duration description information.

In an embodiment, the effect start-time description information describes information about the start tempo point, and the information about the start tempo point may be matched with each tempo point corresponding to the current tempo information. If the matching is successful, the start tempo point is obtained. The effect duration description information describes duration of the video effect, and is described by using the tempo feature, to determine the termination tempo point from the current tempo information according to the effect duration description information. For example, if the effect duration description information is "continued for three tempo points", three tempo points may be obtained through searching starting from the start tempo point, to obtain the termination tempo point. When the effect start-time description information includes period information, for example, repetition is performed every five tempo points, a plurality of start tempo points periodically appearing may be sequentially determined from the current tempo information according to the period information, and termination tempo points that periodically appear and that correspond to each start tempo point may be determined from the current tempo information according to the effect duration description information.

In this embodiment, a relative time relationship between the termination tempo point and the start tempo point may be determined by using the duration description information, thereby quickly determining the termination tempo point. In addition, a start time and/or a termination time of the video motion effect are set on tempo points, thereby strengthening a degree of matching between the video motion effect and music tempi.

Figure 6:
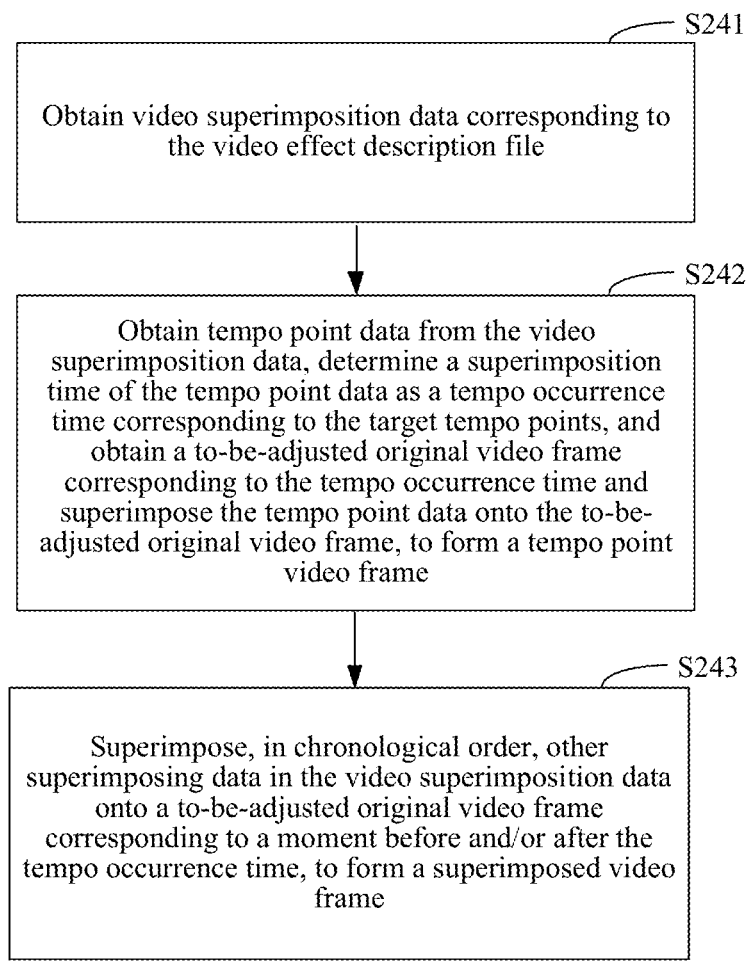
FIG. 6 is a flowchart of generating a target video when a video effect type is a superimposing type according to an embodiment.

In an embodiment, a video effect type corresponding to the video effect description file is a superimposing type, and as shown in FIG. 6, step S240 includes the following steps:

Step S241. Obtain video superimposing data corresponding to the video effect description file.

In an embodiment, the video superimposing data is data that is superimposed onto the original video frame for displaying, and may be continuously changed dynamic data superimposed onto an original video frame sequence for displaying, including animations and maps such as a drum striking animation, a butterfly animation, and a flower, and including watermark types such as transparent halos and light.

Step S242. Obtain tempo point data from the video superimposing data, determine a superimposition time of the tempo point data as a tempo occurrence time corresponding to the target tempo points, and obtain a to-be-adjusted original video frame corresponding to the tempo occurrence time and superimpose the tempo point data onto the to-be-adjusted original video frame, to form a tempo point video frame.

In an embodiment, the tempo point data may be determined according to the video effect description file. The video effect description file may specify the tempo point data by using a time or frame identifier, for example, specifying that the fifth frame in the video superimposing data is the tempo point data, where the tempo point data is data needing to be superimposed onto the original video frame corresponding to the tempo point. For example, an animation frame in which a drum falls in a drum striking animation is the tempo point data. If the video effect description file includes no description about the tempo point data, it may be set, by default, that the tempo point data is a start frame and/or a termination frame of the video superimposing data. A video frame having a same timestamp as the tempo occurrence time is obtained, to obtain the to-be-adjusted original video frame, and the tempo point data is superimposed onto the to-be-adjusted original video frame to form the tempo point video frame. There may be one or more target tempo points described in the video effect description file.

Step S243. Superimpose, in chronological order, other superimposing data in the video superimposing data onto a to-be-adjusted original video frame corresponding to a moment before and/or after the tempo occurrence time, to form a superimposed video frame.

In an embodiment, if the tempo point data is a start frame, frames corresponding to other superimposing data are sequentially superimposed onto the to-be-adjusted original video frame corresponding to the moment after the tempo occurrence time, to form the superimposed video frame. If the tempo point data is an intermediate frame, frames previous the tempo point data are sequentially superimposed onto the to-be-adjusted original video frame corresponding to the moment after the tempo occurrence time, to form a front superimposed video frame, and frames after the tempo point data are sequentially superimposed onto the to-be-adjusted original video frame corresponding to the moment after the tempo occurrence time, to form a rear superimposed video frame. Specifically, if the tempo point data is a termination frame, frames corresponding to other superimposing data are sequentially superimposed onto the to-be-adjusted original video frame corresponding to the moment before the tempo occurrence time, to form the superimposed video frame. After all to-be-adjusted original video frames are superimposed, the target video is formed.

In this embodiment, particular video superimposing data, namely, the tempo point data, is superimposed onto the original video frame corresponding to the tempo point. This controls a superimposing effect, in the video motion effect, of the tempo point data in the video, thereby exactly matching the tempo point data with music tempi. When the tempo point data is a start frame, it is ensured that a start time of the video motion effect is at the target tempo points. When the tempo point data is a termination frame, it is ensured that a termination time of the video motion effect is at the target tempo points.

Figure 7:
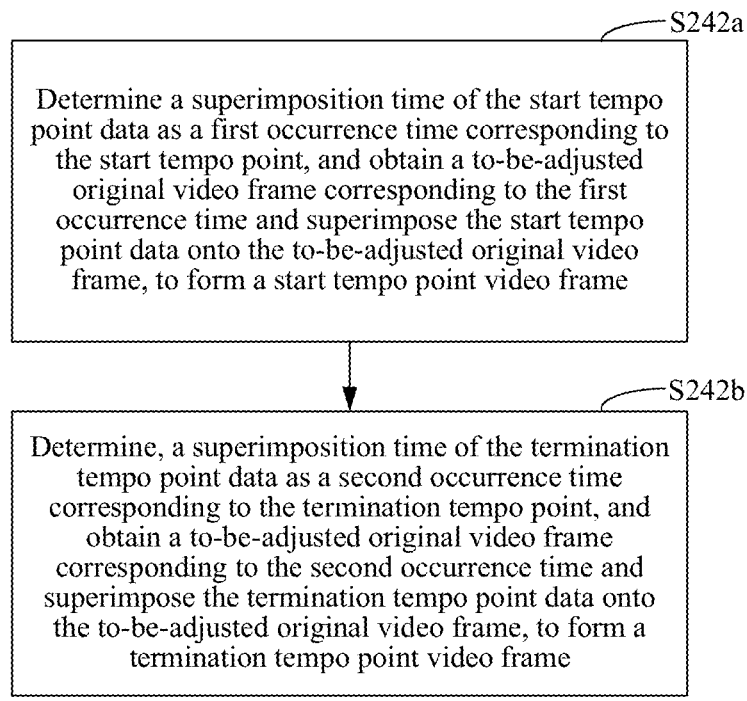
FIG. 7 is a flowchart of generating a tempo point video frame according to an embodiment.

In an embodiment, the tempo point data includes start tempo point data and termination tempo point data, the target tempo points include a start tempo point and a termination tempo point, and as shown in FIG. 7, step S242 includes the following steps:

Step S242a. Determine a superimposition time of the start tempo point data as a first occurrence time corresponding to the start tempo point, and obtain a to-be-adjusted original video frame corresponding to the first occurrence time and superimpose the start tempo point data onto the to-be-adjusted original video frame, to form a start tempo point video frame.

In an embodiment, the start tempo point data is a start frame in the tempo point data. For a video motion effect that periodically appears, tempo point data in each period includes a start tempo point data and a termination tempo point data within the period.

Step S242b. Determine, a superimposition time of the termination tempo point data as a second occurrence time corresponding to the termination tempo point, and obtain a to-be-adjusted original video frame corresponding to the second occurrence time and superimpose the termination tempo point data onto the to-be-adjusted original video frame, to form a termination tempo point video frame.

In an embodiment, the termination tempo point data is a termination frame in the tempo point data.

The Step S243 superimposes, in chronological order, the other superimposing data in the video superimposing data onto a to-be-adjusted original video frame between the first occurrence time and the second occurrence time, to form the superimposed video frame.

In an embodiment, the video superimposing data is controlled to be superimposed onto an original video frame between two tempo points. For example, the video superimposing data is a butterfly or a flower, a tempo of a bar of music between two tempo points is used as a unit for continuously repetitive motion, where an appearing time of the butterfly or the flower is controlled at a tempo point, and a disappearing time is controlled at another tempo point. In another example, light of different colors is added at two sides of the original video frame, the light moves with the music tempi, and a time interval within which the light moves from left to right is X, where X is a time interval multiple corresponding to two adjacent tempo points.

In this embodiment, it is ensured that the video motion effect is between two tempo points, and the start tempo point and the termination tempo point may be adjacent tempo points or spaced tempo points. This not only can ensure that the start time of the video motion effect is at a tempo point, but also can ensure that the termination time of the video motion effect is at a target tempo point, thereby strengthening a sense of rhythm of the video motion effect.

In an embodiment, a video effect corresponding to the video effect description file is a video editing. The video editing includes at least one of speed editing, image editing, and playback order editing. The step S240 determines an editing time of the video editing as a target occurrence time corresponding to the target tempo points, and obtains, according to the target occurrence time, the corresponding to-be-adjusted original video frame for edition, to form an edited video frame.

Figure 8:
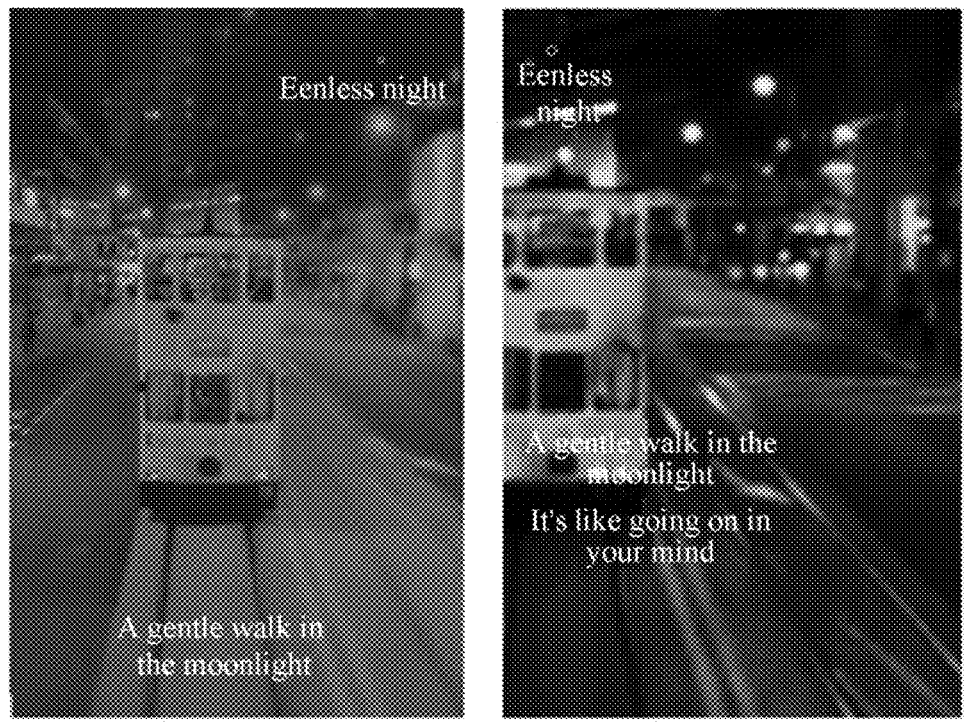
FIG. 8 is a schematic diagram of a target video frame to which a video effect is added according to an embodiment.

In an embodiment, speed editing is to change a playback speed, and can implement fast playback or slow playback through frame extraction or frame insertion. The image editing is to change an original playback image. For example, different or same video frames are combined and superimposed to form a new image frame to replace an original frame, for example, zooming in or out the original frame for displaying, or changing a fuzzy degree for displaying. The playback order editing is to change an original playback order. For example, a video is divided into N segments according to a specific granularity, for example, every 100 ms is a segment, and the eleventh to the twentieth segments of the video are inserted after the fiftieth segment of the video. For the video editing, a video frame can be edited without adding additional data to the video frame. Because the video is edited to form a corresponding video effect, an editing time is set to the target occurrence time corresponding to the target tempo points, to ensure that the video effect formed through the video editing is played at a target tempo point, thereby ensuring matching between an editing effect in the video motion effect and music tempi. For example, a zoomed-in video frame is displayed from a tempo point, and a normal video frame is displayed again at another tempo point. According to different editing effects, one or more corresponding to-be-adjusted original video frames may be included. When there is a plurality of to-be-adjusted original video frames, both an edition start time and an edition end time are controlled on tempo points, thereby strengthening matching between the editing effect and the music tempi. According to an embodiment, FIG. 8 shows a target video frame to which different video effects are added.

Figure 9:
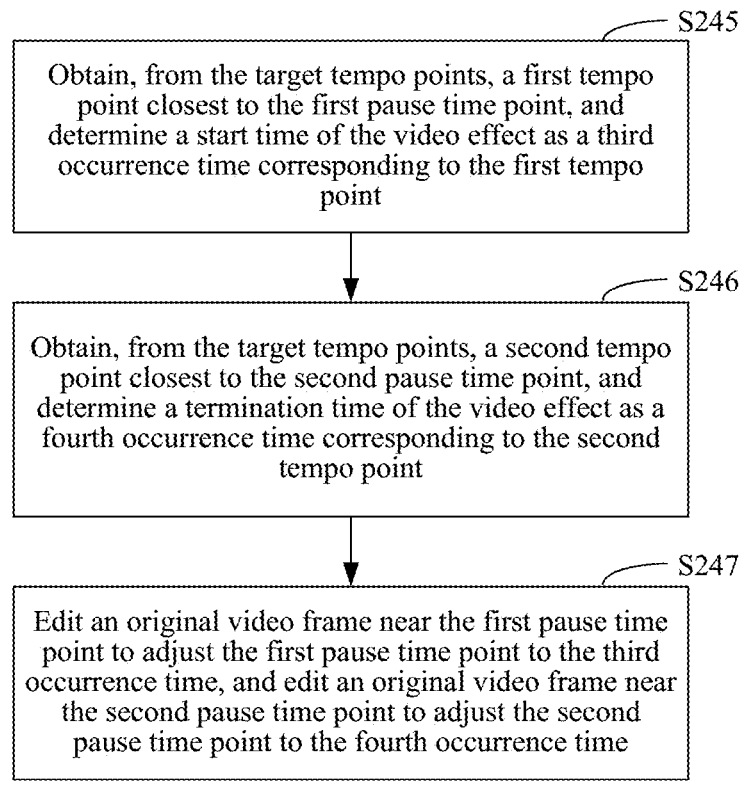
FIG. 9 is a flowchart of adjusting a video frame according to a pause time point according to an embodiment.

In an embodiment, as shown in FIG. 9, the original video includes a first pause time point and an adjacent second pause time point, and the step S240 includes the following steps:

Step S245. Obtain, from the target tempo points, a first tempo point closest to the first pause time point, and determine a start time of the video effect as a third occurrence time corresponding to the first tempo point.

In an embodiment, the pause time point is a time point at which a user pauses recording when recording a video. Recording may be re-started after the pausing, and image switching can be implemented through the pause time point. If the pause point is not at the tempo point, an image switching point does not match with the music tempi. The first tempo point closest to the first pause time point is obtained from the target tempo points. For example, a timestamp corresponding to the first pause time point in the entire video is 3 S, a timestamp corresponding to a tempo point A near 3 S in the target tempo points is 3.5 S, and a timestamp corresponding to tempo point B is 2.8 S. In this case, the first tempo point B is closest to the first pause time point. The start time of the video effect is determined as 2.8 S corresponding to the point B, to match with the pause time.

Step S246. Obtain, from the target tempo points, a second tempo point closest to the second pause time point, and determine a termination time of the video effect as a fourth occurrence time corresponding to the second tempo point.

In an embodiment, video images between the second pause time point and the first pause time point are consecutive video images, and image switching occurs after the second pause time point. Therefore, the second tempo point closest to the second pause time point is used as the termination time of the video effect, so that the video effect matches with the pause time.

Step S247. Edit an original video frame near the first pause time point to adjust the first pause time point to the third occurrence time, and edit an original video frame near the second pause time point to adjust the second pause time point to the fourth occurrence time.

In an embodiment, if the first pause time point is before the third occurrence time, frame extraction is performed on video frames between the first pause time point and the third occurrence time, and the video frames are accelerated, to adjust the first pause time point to the third occurrence time, thereby ensuring that an image switching point is at the tempo point. If the first pause time point is after the third occurrence time, for example, the first pause time point is 1 S, video frames near the first pause time point, that is, a video frame between 1 S and 1.3 S is duplicated and filled between the first pause time point and the third occurrence time, to adjust the first pause time point to the third occurrence time, thereby ensuring that an image switching point is at the tempo point.

In addition, if the second pause time point is before the fourth occurrence time, for example, the second pause time point is 1 S, video frames near the second pause time point, that is, a video between 0.5 S and 1 S is duplicated and filled between the second pause time point and the fourth occurrence time, to adjust the second pause time point to the fourth occurrence time, thereby ensuring that an image switching point is at the tempo point. If the second pause time point is after the fourth occurrence time, frame extraction is performed on video frames between the second pause time point and the fourth occurrence time, to adjust the second pause time point to the fourth occurrence time, thereby ensuring that an image switching point is at the tempo point.

In this embodiment, the start time and the end time of the video motion effect are adjusted by using the pause time point, and the original video frame is edited, to adjust the pause time point to the tempo point, thereby simultaneously starting or terminating the video motion effect and the image switching, and ensuring that an image switching point is at the tempo point. Because the pause time point is determined through a random user operation, association between the video motion effect and the user operation is further strengthened, so that an adaptation relationship between the video motion effect and the tempo dynamically changes with the user operation, thereby improving self-adaptation.

Figure 10:
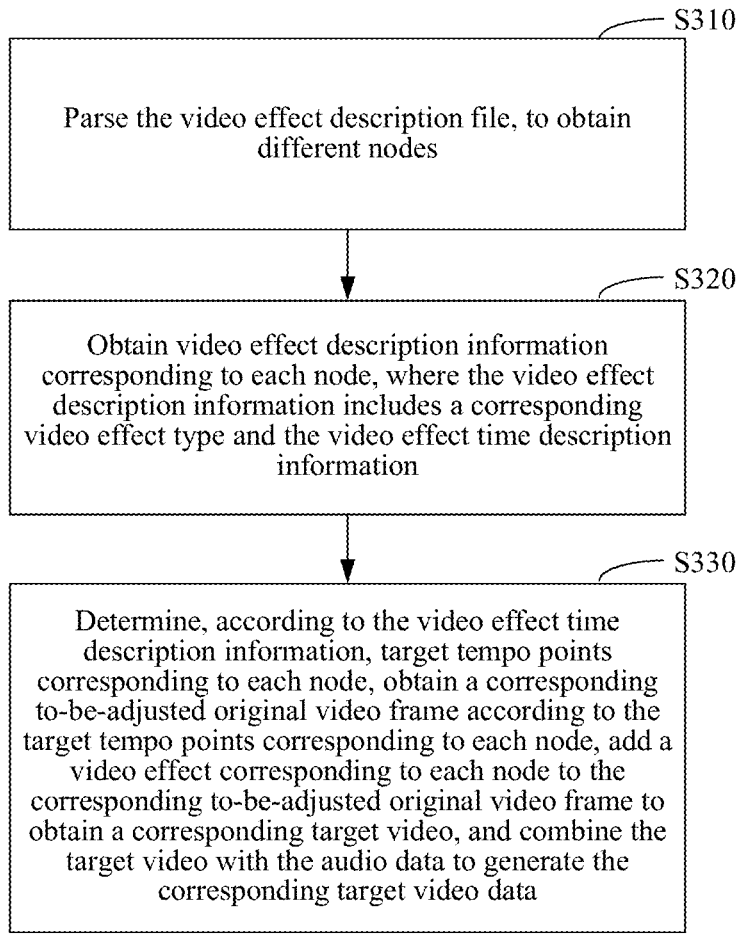
FIG. 10 is a flowchart of generating a target video frame according to another embodiment.

In an embodiment, after the obtaining a video effect description file in the step S220, as shown in FIG. 10, the method further includes the following steps:

Step S310. Parse the video effect description file, to obtain different nodes.

In an embodiment, various different effects such as speed editing, image editing, playback order editing, video animation superimposing, and watermark superimposing, may be referred to as motion sub-effects. Each motion sub-effect may be described by using one node, and different nodes may be distinguished by using preset characters.

Step S320. Obtain video effect description information corresponding to each node, where the video effect description information includes a corresponding video effect type and the video effect time description information.

In an embodiment, each node correspondingly describes a specific motion sub-effect, and each motion sub-effect has corresponding video effect description information. The video effect type describe an effect type corresponding to a current motion sub-effect, and the video effect time description information describe a start time, duration, a period, and the like corresponding to the current motion sub-effect.

Step S330. Determine, according to the video effect time description information, target tempo points corresponding to each node, obtain a corresponding to-be-adjusted original video frame according to the target tempo points corresponding to each node, add a video effect corresponding to each node to the corresponding to-be-adjusted original video frame to obtain a corresponding target video, and combine the target video with the audio data to generate the corresponding target video data.

In an embodiment, for the video effect time description information corresponding to each node, target tempo points corresponding to each node is determined, a corresponding to-be-adjusted original video frame is obtained, and a video effect corresponding to each node is added to the corresponding to-be-adjusted original video frame. Video effects corresponding to a plurality of nodes may be added to a same original video frame, thereby implementing superimposing and combination of different video effects. Because each video effect is added corresponding to the tempo point, matching between a plurality of different video effects and the music tempi is implemented.

Figure 11:
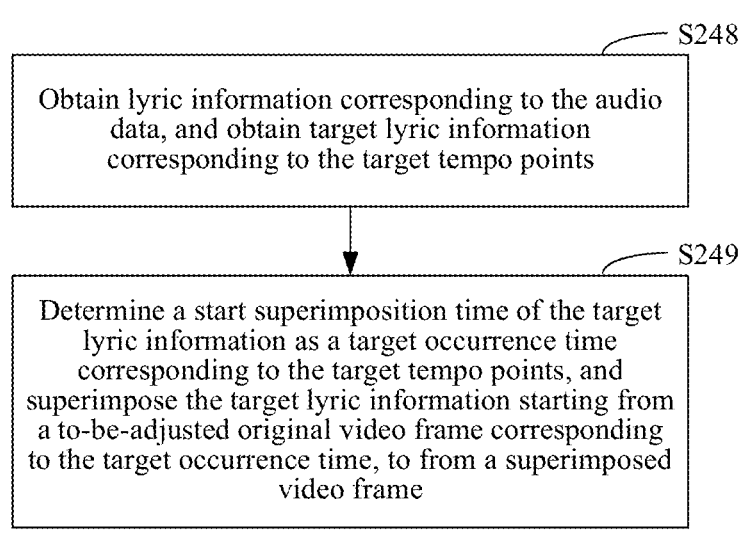
FIG. 11 is a flowchart of generating a target video frame according to still another embodiment.

In an embodiment, as shown in FIG. 11, the step S240 includes the following steps:

Step S248. Obtain lyric information corresponding to the audio data, and obtain target lyric information corresponding to the target tempo points.

In an embodiment, the lyric information includes lyric text and a timestamp corresponding to each character in the lyric text. Lyric text corresponding to a timestamp matching the target tempo points is searched to obtain the target lyric information. The target lyric information may be one or more characters.

Step S249. Determine a start superimposition time of the target lyric information as a target occurrence time corresponding to the target tempo points, and superimpose the target lyric information starting from a to-be-adjusted original video frame corresponding to the target occurrence time, to from a superimposed video frame.

Figure 12:
FIG. 12 is a schematic diagram of a target video frame obtained after adding a lyric effect according to an embodiment.

In an embodiment, lyrics start to be superimposed onto the target tempo points, so that display of the lyrics matches with the tempi, and the lyrics appear at a tempo point. Further, a superimposition ending time of the lyrics is another tempo point, so that a lyric disappearing time also matches with the tempi, and the lyrics appears at the tempo point and disappears at the tempo point, thereby strengthening a degree of matching between the video effect and the music tempi. In an embodiment, the target lyric information includes different languages, for example, both Chinese and English lyrics are displayed, thereby strengthening flexibility of the video effect. FIG. 12 is a schematic diagram of a superimposed video frame obtained after superimposing the target lyric information according to an embodiment.

In an embodiment, a computer device is further provided. An internal structure of the computer device may be shown in FIG. 2. The computer device includes a video data generation apparatus, the video data generation apparatus includes various modules (e.g., processing circuitry), and the modules may be partially or completely implemented by software, hardware, or a combination thereof.

Figure 13:
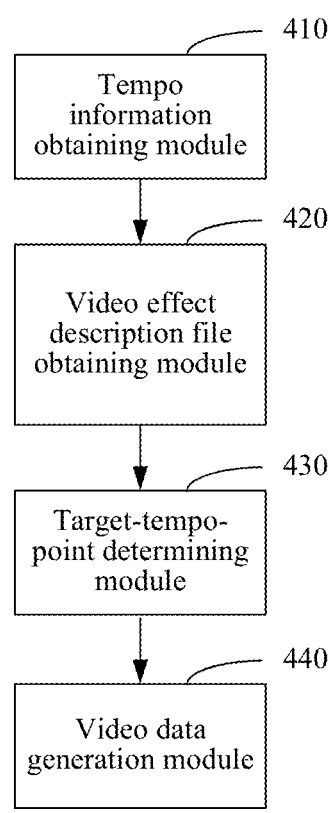
FIG. 13 is a structural block diagram of a video data generation apparatus according to an embodiment.

In an embodiment, as shown in FIG. 13, a video data generation apparatus is provided. The video data generation apparatus includes a tempo information obtaining module 410, a video effect description file obtaining module 420, a target-tempo-point determining module 430, and a video data generation module 440.

The tempo information obtaining module 410 can obtain to-be-added audio data corresponding to an original video, and obtain current tempo information corresponding to the audio data.

The video effect description file obtaining module 420 can obtain a video effect description file. The video effect description file includes video effect time description information. The video effect time description information is described by using a tempo feature.

The target-tempo-point determining module 430 can determine target tempo points in the current tempo information according to the video effect time description information.

The video data generation module 440 can obtain a corresponding to-be-adjusted original video frame according to the target tempo points, add a video effect corresponding to the video effect description file to the to-be-adjusted original video frame to obtain a corresponding target video, and combine the target video with the audio data to generate corresponding target video data.

Figure 14:
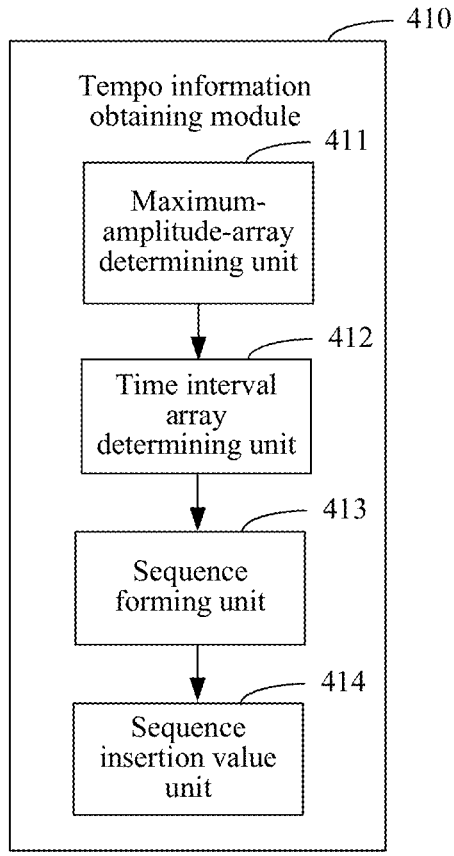
FIG. 14 is a structural block diagram of a tempo information obtaining module according to an embodiment.

In an embodiment, as shown in FIG. 14, the tempo information obtaining module 410 includes a maximum-amplitude-array determining unit 411, a time interval array determining unit 412, a sequence forming unit 413, and a sequence insertion value unit 414.

The maximum-amplitude-array determining unit 411 can convert the audio data into waveform data, scan the waveform data within a preset duration window, and sequentially obtain time points corresponding to maximum amplitudes within the preset duration window, to form a maximum amplitude array.

The time interval array determining unit 412 can sequentially calculate a time interval corresponding to two adjacent time points in the maximum amplitude array, to form a time interval array.

The sequence forming unit 413 can obtain, as a target time interval, a median time interval corresponding to the time interval array, and obtain target time points from the maximum amplitude array to form a first sequence, where a time interval corresponding to two adjacent time points in the first sequence is a multiple of the target time interval.

The sequence insertion value unit 414 can insert a time point into the first sequence so that a time interval corresponding to two adjacent time points is the target time interval, to obtain a target sequence, where each time point in the target sequence is a tempo point corresponding to the audio data.

Figure 15:
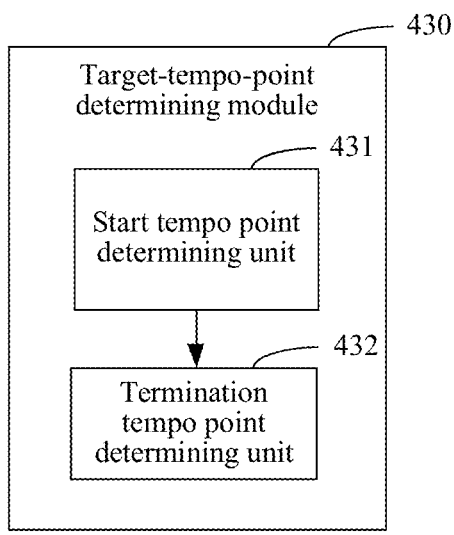
FIG. 15 is a structural block diagram of a target tempo determining module according to an embodiment.

In an embodiment, as shown in FIG. 15, the target-tempo-point determining module 430 includes a start tempo point determining unit 431 and a termination tempo point determining unit 432.

The start tempo point determining unit 431 can obtain effect start-time description information from the video effect time description information, and determine a start tempo point in the current tempo information according to the effect start-time description information.

The termination tempo point determining unit 432 can obtain effect duration description information from the video effect time description information, and determining a termination tempo point in the current tempo information according to the effect duration description information.

Figure 16:
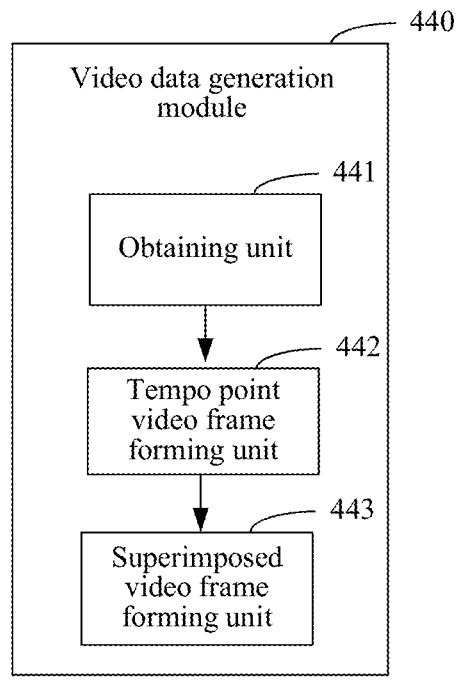
FIG. 16 is a structural block diagram of a video data generation module according to an embodiment.

In an embodiment, a video effect type corresponding to the video effect description file is a superimposing type, and as shown in FIG. 16, the video data generation module 440 includes an obtaining unit 441, a tempo point video frame forming unit 442, and a superimposed video frame forming unit 443.

The obtaining unit 441 can obtain video superimposing data corresponding to the video effect description file.

The tempo point video frame forming unit 442 can obtain tempo point data from the video superimposing data, determine a superimposition time of the tempo point data as a tempo occurrence time corresponding to the target tempo points, obtain a to-be-adjusted original video frame corresponding to the tempo occurrence time, and superimpose the tempo point data onto the to-be-adjusted original video frame to form a tempo point video frame.

The superimposed video frame forming unit 443 can superimpose, in chronological order, other superimposing data in the video superimposing data onto a to-be-adjusted original video frame corresponding to a moment before and/or after the tempo occurrence time, to form a superimposed video frame.

Figure 17:
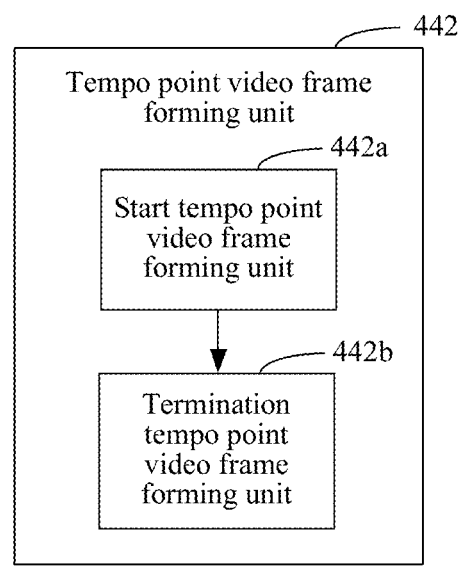
FIG. 17 is a structural block diagram of a tempo point video frame forming unit according to an embodiment.

In an embodiment, the tempo point data includes start tempo point data and termination tempo point data, the target tempo points include a start tempo point and a termination tempo point, and as shown in FIG. 17, the tempo point video frame forming unit 442 includes a start tempo point video frame forming unit 442a and a termination tempo point video frame forming unit 442b.

The start tempo point video frame forming unit 442a can determine a superimposition time of the start tempo point data as a first occurrence time corresponding to the start tempo point, obtain a to-be-adjusted original video frame corresponding to the first occurrence time, and superimpose the start tempo point data onto the to-be-adjusted original video frame to form a start tempo point video frame.

The termination tempo point video frame forming unit 442b can determine a superimposition time of the termination tempo point data as a second occurrence time corresponding to the termination tempo point, obtain a to-be-adjusted original video frame corresponding to the second occurrence time, and superimpose the termination tempo point data onto the to-be-adjusted original video frame to form a termination tempo point video frame.

The superimposed video frame forming unit 443 can superimpose, in chronological order, the other superimposing data in the video superimposing data onto a to-be-adjusted original video frame between the first occurrence time and the second occurrence time to form the superimposed video frame.

In an embodiment, a video effect type corresponding to the video effect description file is an editing type, the editing type includes at least one of speed editing, image editing, and playback order editing, and the video data generation module 440 can determine an editing time of video editing as a target occurrence time corresponding to the target tempo points, and obtain, according to the target occurrence time, the corresponding to-be-adjusted original video frame for edition to form an edited video frame.

Figure 18:
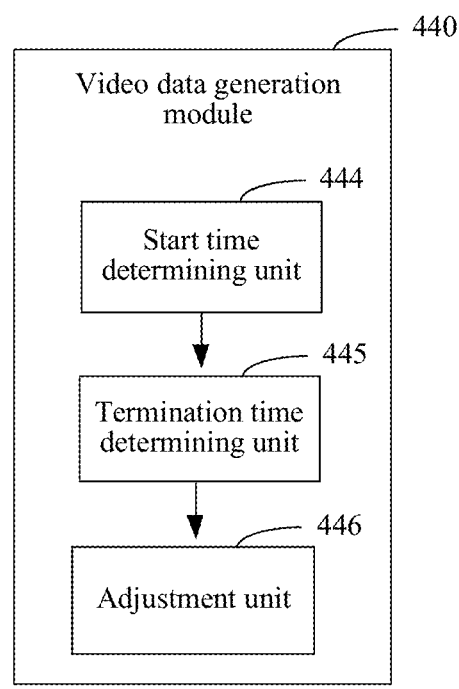
FIG. 18 is a structural block diagram of a video data generation module according to an embodiment.

In an embodiment, the original video includes a first pause time point and an adjacent second pause time point, and as shown in FIG. 18, the video data generation module 440 includes a start time determining unit 444, a termination time determining unit 445, and an adjustment unit 446.

The start time determining unit 444 can obtain, from the target tempo points, a first tempo point closest to the first pause time point, and determine a start time of the video effect as a third occurrence time corresponding to the first tempo point.

The termination time determining unit 445 can obtain, from the target tempo points, a second tempo point closest to the second pause time point, and determine a termination time of the video effect as a fourth occurrence time corresponding to the second tempo point.

The adjustment unit 446 can edit an original video frame near the first pause time point to adjust the first pause time point to the third occurrence time, and edit an original video frame near the second pause time point to adjust the second pause time point to the fourth occurrence time.

In an embodiment, the video effect description file obtaining module 420 can parse the video effect description file to obtain different nodes, and obtain video effect description information corresponding to each node, where the video effect description information includes a corresponding video effect type and the video effect time description information.

The target-tempo-point determining module 430 can determine, according to the video effect time description information, target tempo points corresponding to each node.

The video data generation module 440 can obtain a corresponding to-be-adjusted original video frame according to the target tempo points corresponding to each node, add a video effect corresponding to each node to the corresponding to-be-adjusted original video frame to obtain a corresponding target video, and combine the target video with the audio data to generate the corresponding target video data.

In an embodiment, the video data generation module 440 can obtain lyric information corresponding to the audio data, obtain target lyric information corresponding to the target tempo points, determine a start superimposition time of the target lyric information as a target occurrence time corresponding to the target tempo points, and superimpose the target lyric information starting from a to-be-adjusted original video frame corresponding to the target occurrence time to from a superimposed video frame.

It is understood that, the steps in the embodiments of this application are not necessarily performed in an order indicated by the step numbers. Unless otherwise clearly noted in this specification, the steps are performed without any strict sequence limit, and may be performed in other orders. In addition, at least some steps in the embodiments may include a plurality of sub-steps or a plurality of stages, and these sub-steps or stages are not necessarily performed at a same moment, and may be performed at different moments. The sub-steps or stages are not necessarily performed in sequence, and the sub-steps or stages and at least some of other steps or sub-steps or stages of other steps may be performed repeatedly or alternately.

A person of ordinary skill in the art may understand that all or some of the processes of the methods in the embodiments may be implemented by a computer program instructing relevant hardware. The program may be stored in a non-volatile computer readable storage medium. When the program runs, the processes of the methods in the embodiments are performed. References to the memory, the storage, the database, or other media used in the embodiments provided in this application may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or a cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink (Synchlink) DRAM (SLDRAM), a rambus (Rambus) dynamic RAM (RDRAM), a direct rambus dynamic RAM (DRDRAM), and a rambus dynamic RAM (RDRAM).

Various technical features in the embodiments may be combined randomly. For ease of description, possible combinations of various technical features in the embodiments are not all described. However, the combinations of the technical features are considered as falling within the scope recorded in this specification provided that the combinations of the technical features are compatible with each other.

The embodiments describe several implementations of this application, which are described specifically and in detail, and therefore cannot be construed as a limitation to the patent scope of the present disclosure. It is noted that, a person of ordinary skill in the art may make various changes and improvements without departing from the ideas of this application, which shall all fall within the protection scope of this application. Therefore, the protection scope of the patent of this application shall be subject to the appended claims.

What is claimed is:

1. A video data generation method, comprising:
   obtaining, by processing circuitry of an apparatus, tempo information from audio data that is inserted in a target video;
   determining, by the processing circuitry, a plurality of target tempo points in the tempo information according to video effect time description information included in a video effect description file, the video effect description file including video effect data that is used to adjust one or more video frames of an original video that is independent from the audio data;
   obtaining, by the processing circuitry, the one or more video frames from the original video according to the plurality of target tempo points;
   adjusting, by the processing circuitry, the one or more video frames with the video effect data included in the video effect description file; and
   generating, by the processing circuitry, the target video including the adjusted one or more video frames and the audio data,
   wherein when the video effect data includes video superimposing data,
   the obtaining the one or more video frames according to the plurality of target tempo points includes
      determining, by the processing circuitry, a superimposition time of the video superimposing data as a tempo occurrence time of the plurality of target tempo points, and
      obtaining, by the processing circuitry, the one or more video frames according to the tempo occurrence time; and
   the adjusting the one or more video frames with the video effect data includes
      superimposing, by the processing circuitry, the video superimposing data onto the one or more video frames to form one or more superimposed video frames.

2. The method according to claim 1, wherein the obtaining the tempo information from the audio data includes:
   determining, by the processing circuitry, a first array from waveform data that is converted from the audio data, each element in the first array being a time point corresponding to a maximum amplitude of the waveform data within a preset duration window;
   determining, by the processing circuitry, a second array based on the first array, each element in the second array being a time interval corresponding to two adjacent time points in the first array; and
   determining, by the processing circuitry and based on the first array and the second array, a plurality of tempo points from the audio data as the tempo information of the audio data.

3. The method according to claim 1, wherein the determining the plurality of target tempo points in the tempo information according to the video effect time description information includes:
   obtaining, by the processing circuitry, video effect start-time description information from the video effect time description information;
   determining, by the processing circuitry, a start tempo point in the tempo information according to the video effect start-time description information;
   obtaining, by the processing circuitry, video effect duration description information from the video effect time description information; and
   determining, by the processing circuitry, a termination tempo point in the tempo information according to the video effect duration description information.

4. The method according to claim 1, wherein when the video superimposing data includes start tempo point data and termination tempo point data, and the plurality of target tempo points include a start tempo point and a termination tempo point,
   the determining the superimposition time of the video superimposing data as the tempo occurrence time of the plurality of target tempo points includes
      determining, by the processing circuitry, a superimposition time of the start tempo point data as a first tempo occurrence time corresponding to the start tempo point, and
      determining, by the processing circuitry, a superimposition time of the termination tempo point data as a second tempo occurrence time corresponding to the termination tempo point;
   the obtaining the one or more video frames according to the tempo occurrence time includes
      obtaining, by the processing circuitry, a first video frame according to the first tempo occurrence time, and
      obtaining, by the processing circuitry, a second video frame according to the second temp occurrence time; and
   the superimposing the video superimposing data onto the one or more video frames includes
      superimposing, by the processing circuitry, the start tempo point data onto the first video frame,
      superimposing, by the processing circuitry, the termination tempo point data onto the second video frame, and
      superimposing, by the processing circuitry, other superimposing data than the start tempo point data and the termination point data in the video superimposing data onto the one or more video frames between the first tempo occurrence time and the second tempo occurrence time to form the one or more superimposed video frames.

5. The method according to claim 1, wherein when the video effect data includes video editing data,
the obtaining the one or more video frames according to the plurality of target tempo points includes:
determining, by the processing circuitry, an editing time of the video editing data as a target occurrence time of the plurality of target tempo points; and
obtaining, by the processing circuitry, the one or more video frames according to the target occurrence time.

6. The method according to claim 1, wherein when the original video includes a first pause time point and an adjacent second pause time point,
the obtaining the one or more video frames according to the plurality of target tempo points includes:
determining, by the processing circuitry and from the plurality of target tempo points, a first tempo point closest to the first pause time point as a start time of the video effect data;
determining, by the processing circuitry and from the plurality of target tempo points, a second tempo point closest to the second pause time point as a termination time of the video effect data;
editing, by the processing circuitry, a first video frame near the first pause time point to adjust the first pause time point to the start time of the video effect data; and
editing, by the processing circuitry, a second video frame near the second pause time point to adjust the second pause time point to the termination time of the video effect data.

7. The method according to claim 1, further comprising:
obtaining, by the processing circuitry and from the video effect description file, a plurality of video effect data, each of the plurality of video effect data having respective video effect time information;
determining, by the processing circuitry and according to the respective video effect time description information, a plurality of target tempo points for each of the plurality of video effect data;
obtaining, by the processing circuitry, one or more video frames for each of the plurality of video effect data according to the respective plurality of target tempo points;
inserting, by the processing circuitry, each of the plurality of video effect data to the respective one or more video frames; and
generating, by the processing circuitry, the target video including the one or more video frames of each of the plurality of video effect data and the audio data.

8. The method according to claim 1, wherein when the audio data includes lyric information,
the obtaining the one or more video frames according to the plurality of target tempo points includes
obtaining, by the processing circuitry, target lyric information from the lyric information according to the plurality of target tempo points, and
determining, by the processing circuitry, the one or more video frames according to a start superimposition time of the target lyric information; and
the adjusting the one or more video frames with the video effect data includes
superimposing, by the processing circuitry, the target lyric information to the one or more video frames to form one or more superimposed video frames.

9. A video data generation apparatus, comprising:
processing circuitry configured to:
obtain tempo information from audio data that is inserted in a target video;
determine a plurality of target tempo points in the tempo information according to video effect time description information included in a video effect description file, the video effect description file including video effect data that is used to adjust one or more video frames of an original video that is independent from the audio data;
obtain the one or more video frames from the original video according to the plurality of target tempo points;
adjust the one or more video frames with the video effect data included in the video effect description file; and
generate the target video including the adjusted one or more video frames and the audio data,
wherein when the video effect data is video superimposing data, the processing circuitry is further configured to:
determine a superimposition time of the video superimposing data as a tempo occurrence time of the plurality of target tempo points;
obtain the one or more video frames according to the tempo occurrence time; and
superimpose the video superimposing data onto the one or more video frames to form one or more superimposed video frames.

10. The apparatus according to claim 9, wherein the processing circuitry is further configured to:
determine a first array from waveform data that is converted from the audio data, each element in the first array being a time point corresponding to a maximum amplitude of the waveform data within a preset duration window;
determine a second array based on the first array, each element in the second array being a time interval corresponding to two adjacent time points in the first array; and
determine, based on the first array and the second array, a plurality of tempo points from the audio data as the tempo information of the audio data.

11. The apparatus according to claim 9, wherein the processing circuitry is further configured to:
obtain video effect start-time description information from the video effect time description information;
determine a start tempo point in the tempo information according to the video effect start-time description information;
obtain video effect duration description information from the video effect time description information; and
determine a termination tempo point in the tempo information according to the video effect duration description information.

12. The apparatus according to claim 9, wherein when the video superimposing data includes start tempo point data and termination tempo point data, and the plurality of target tempo points include a start tempo point and a termination tempo point, the processing circuitry is further configured to:
determine a superimposition time of the start tempo point data as a first tempo occurrence time corresponding to the start tempo point;
determine a superimposition time of the termination tempo point data as a second tempo occurrence time corresponding to the termination tempo point;

obtain a first video frame according to the first tempo occurrence time;
obtain a second video frame according to the second temp occurrence time;
superimpose the start tempo point data onto the first video frame;
superimpose the termination tempo point data onto the second video frame; and
superimpose other superimposing data than the start tempo point data and the termination point data in the video superimposing data onto the one or more video frames between the first tempo occurrence time and the second tempo occurrence time to form the one or more superimposed video frames.

13. The apparatus according to claim 9, wherein when the video effect data further includes video editing data, the processing circuitry is further configured to:
determine an editing time of the video editing data as a target occurrence time of the plurality of target tempo points; and
obtain the one or more video frames according to the target occurrence time.

14. The apparatus according to claim 9, wherein when the original video includes a first pause time point and an adjacent second pause time point, the processing circuitry is further configured to:
determine, from the plurality of target tempo points, a first tempo point closest to the first pause time point as a start time of the video effect data;
determine, from the plurality of target tempo points, a second tempo point closest to the second pause time point as a termination time of the video effect data;
edit a first video frame near the first pause time point to adjust the first pause time point to the start time of the video effect data; and
edit a second video frame near the second pause time point to adjust the second pause time point to the termination time of the video effect data.

15. The apparatus according to claim 9, wherein the processing circuitry is further configured to:
obtain, from the video effect description file, a plurality of video effect data, each of the plurality of video effect data having respective video effect time information;
determine, according to the respective video effect time description information, a plurality of target tempo points for each of the plurality of video effect data;
obtain one or more video frames for each of the plurality of video effect data according to the respective plurality of target tempo points;
insert each of the plurality of video effect data to the respective one or more video frames; and
generate the target video including the one or more video frames of each of the plurality of video effect data and the audio data.

16. The apparatus according to claim 9, wherein when the audio data includes lyric information, the processing circuitry is further configured to:
obtain target lyric information from the lyric information according to the plurality of target tempo points;
determine the one or more video frames according to a start superimposition time of the target lyric information; and
superimpose the target lyric information to the one or more video frames to form one or more superimposed video frames.

17. A non-transitory computer-readable storage medium storing a program executable by at least one processor to perform:
obtaining tempo information from audio data that is inserted in a target video;
determining a plurality of target tempo points in the tempo information according to video effect time description information included in a video effect description file, the video effect description file including video effect data that is used to adjust one or more video frames of an original video that is independent from the audio data;
obtaining the one or more video frames from the original video according to the plurality of target tempo points;
adjusting the one or more video frames with the video effect data included in the video effect description file; and
generating the target video including the adjusted one or more video frames and the audio data,
wherein when the video effect data is video superimposing data,
the obtaining the one or more video frames according to the plurality of target tempo points includes
determining, by the processing circuitry, a superimposition time of the video superimposing data as a tempo occurrence time of the plurality of target tempo points, and
obtaining, by the processing circuitry, the one or more video frames according to the tempo occurrence time; and
the adjusting the one or more video frames with the video effect data includes
superimposing, by the processing circuitry, the video superimposing data onto the one or more video frames to form one or more superimposed video frames.

18. The non-transitory computer-readable storage medium according to claim 17, wherein the program is executable by the at least one processor to perform:
determining a first array from waveform data that is converted from the audio data, each element in the first array being a time point corresponding to a maximum amplitude of the waveform data within a preset duration window;
determining a second array based on the first array, each element in the second array being a time interval corresponding to two adjacent time points in the first array; and
determining, based on the first array and the second array, a plurality of tempo points from the audio data as the tempo information of the audio data.

* * * * *